US 7,419,713 B2

(12) United States Patent
Wilkens et al.

(10) Patent No.: US 7,419,713 B2
(45) Date of Patent: Sep. 2, 2008

(54) COMPOSITE COMPONENT

(75) Inventors: Reiner Wilkens, Leverkusen (DE);
Reiner Erkelenz, Köln (DE); Adolf Lammeck, Lohmar (DE); Martin Klocke, Köln (DE); Klaus Konejung, Bergisch Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 244 days.

(21) Appl. No.: 11/069,866

(22) Filed: Mar. 1, 2005

(65) Prior Publication Data
US 2005/0208263 A1    Sep. 22, 2005

(30) Foreign Application Priority Data
Mar. 5, 2004    (DE)    ................. 10 2004 010 810

(51) Int. Cl.
*B32B 1/04*    (2006.01)
*B32B 3/02*    (2006.01)
(52) U.S. Cl. .................................. 428/68; 428/73
(58) Field of Classification Search ................ 428/116, 428/70, 71, 72, 73, 74, 76, 68; 264/257, 264/324, 250
See application file for complete search history.

(56) References Cited
U.S. PATENT DOCUMENTS

| 4,330,494 A | * | 5/1982 | Iwata et al. ................. 264/46.2 |
| 4,985,106 A |   | 1/1991 | Nelson ....................... 156/276 |
| 5,789,057 A | * | 8/1998 | Naitou et al. ................. 428/73 |
| 6,231,944 B1 |   | 5/2001 | Holt ............................ 428/57 |
| 6,338,234 B1 | * | 1/2002 | Muise et al. .................. 53/411 |
| 6,761,953 B2 |   | 7/2004 | Haas et al. .................... 428/73 |
| 2001/0038229 A1 |   | 11/2001 | Dettoni et al. ........... 296/146.7 |
| 2003/0134085 A1 |   | 7/2003 | Haas et al. ................... 428/116 |
| 2005/0025929 A1 | * | 2/2005 | Smith et al. ................... 428/73 |

* cited by examiner

*Primary Examiner*—Timothy M. Speer
*Assistant Examiner*—Gordon R Baldwin
(74) *Attorney, Agent, or Firm*—Lyndanne M. Whalen

(57) ABSTRACT

The invention describes a composite component based on a sandwich structure, composed of:
(a) at least two outer layers which independently of each other comprised at least one film, sheet, fiber mat and/or foam made from metal, plastic, glass, natural material and/or carbon, and
(b) a core positioned between the outer layers, made from metal, plastic, natural material and/or paper having a large number of cavities, in which a casting resin system at least partially penetrates the outer layers and the core and the outer layers are bonded to the core by press molding. The composite component is characterised in that in at least one area of the sandwich structure the outer layers are pressed together and the compressed area of the sandwich structure is encapsulated with thermoplastic polymer.

Composite base on a sandwich structure are obtained by encapsulating at least one area of the two outer layers. The encapsulating area is that area of the two outer layers have been pressed together.

9 Claims, 3 Drawing Sheets

COMPOSITE COMPONENT

BACKGROUND OF THE INVENTION

The present invention relates to a composite component having a sandwich structure which is made up of at least one core positioned between two outer layers. A casting resin system penetrates into the outer layers at least partially, and the layers are bonded together by press molding. The present invention also relates to a process for the production of such a composite component.

Lightweight composite components having a sandwich structure, made up of a core having a honeycomb or corrugated structure, made for example from paper, aluminum or plastic, and a lower and upper outer layer composed of fiber mats, made for example from natural, glass, plastic or carbon fibers, are known from EP 1 319 503 A, for example. Owing to their low weight per unit area and their high flexural strength with low wall thickness, they are used as interior trim in automotive construction, for example. The fiber mats constituting the lower and upper outer layer are wetted with a two-component polyurethane (PU) system, for example, which penetrates into part or all of the core. The PU system, which can be readily foaming, for example, shapes and bonds the outer layers to the core.

These sandwich composite components are manufactured by the compression molding process. The entire surface of both sides of the sandwich structure comprising core and outer layers is sprayed with the two-component PU system, and the structure is placed in the mold, which is generally heated to 60 to 160° C., preferably 120 to 140° C., and press molded. After being released from the mold and cooled, the composite components can be punched, milled or laminated, for example, if required.

The integration of screw connections, partial metal reinforcements, joining elements, fixing or similar elements, is only possible within limits. For example, during production of the composite component in the compression mold, the inserts can be positioned appropriately and bonded to the composite component by the foaming and curing PU system during press molding. The inserts can also be completely enclosed in the composite component by placing an outer layer, e.g. a fiber mat, on top of the insert and pressing it onto the insert during press molding.

The joining of molded parts, made from plastic, for example, to the lightweight composite component by welding is also known. This is relatively complex, however, since the molded parts first have to be produced separately and then introduced into a welding tool for welding. In addition, the quality of the welded joint is very much dependent on the materials that are used.

The encapsulation of such sandwich composite components with free-flowing materials such as polyurethane is also known. The disadvantage of these composite components injection molded with PU is their relatively low rigidity and strength. Furthermore, the selective injection molding of individual areas of the composite component with the crosslinking PU resin system is difficult. The formation of flashes in the injection molded PU also requires costly secondary finishing. Finally, an injection molded PU surface does not satisfy the optical requirements for certain applications and cannot be pigmented.

SUMMARY OF THE INVENTION

The object of the present invention, starting from the lightweight composite components having a sandwich structure known from the prior art, is to provide a composite component which is suitable for the integration of functional elements and molded parts, made from thermoplastic polymer in particular, by means of the injection molding process.

This and other objects which will be apparent to those skilled in the art are accomplished by encapsulating a compressed area of a press molded composite made of at least two outer layers and a core with a thermoplastic polymer.

DETAILED DESCRIPTION OF THE INVENTION

Figure 1:
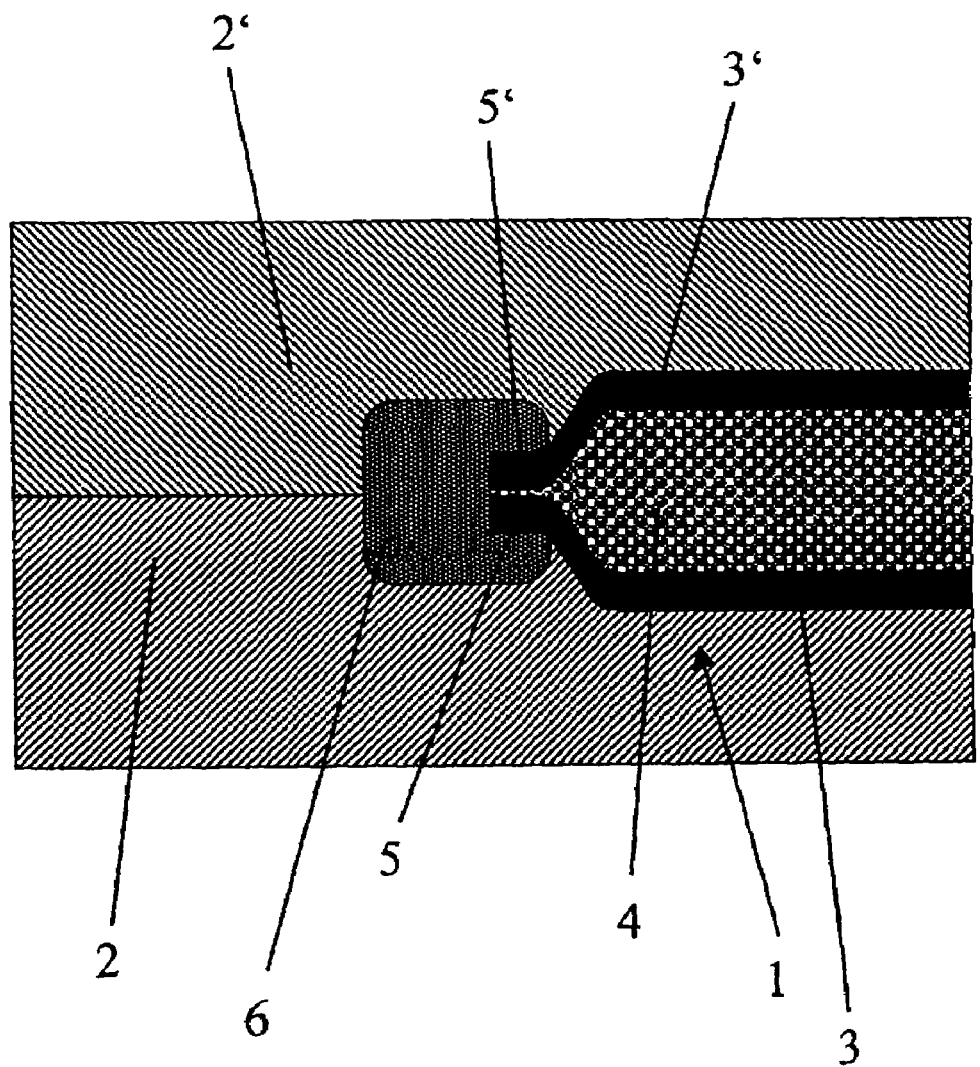
FIG. 1 shows a schematic cross-section of a section of the composite component according to the invention in the injection mold after injection molding of the thermoplastic polymer in a compressed edge area.

The present invention provides a composite component based on a sandwich structure, composed of:
  (a) at least two outer layers which, independently of each other are composed of at least one film, sheet, fiber mat and/or foam made from metal, plastic, glass, natural material and/or carbon, and
  (b) a core positioned between the outer layers, made from metal, plastic, natural material and/or paper having a large number of cavities, wherein a casting resin system at least partially penetrates the outer layers and the core and the outer layers are bonded to the core by press molding.

In at least one area of the sandwich structure, the outer layers are pressed together and the compressed area of the sandwich structure is encapsulated with thermoplastic polymer.

The composite of the present invention includes at least three layers: a core and two outer layers, one on either side of the core. A structure comprising a multi-layer core and multi-layer outer layers is also possible. The core may be metal, plastic, natural material and/or paper. Preferred metals are aluminum, magnesium and alloys thereof. Preferred plastics are polyamides, polyesters, polycarbonates, polypropylene, polystyrene, ABS, polyamide imide (PAI) and mixtures thereof.

The plastics can be reinforced or non-reinforced, filled or unfilled. Examples of natural materials are wood, flax, sisal, jute, hemp. Within the meaning of the present invention, paper is understood to be any type of paper (e.g., multi-layer paper, cardboard, or resin-impregnated paper).

An important feature of the composite component of the present invention is the core's large number of cavities. The cavities can be of any geometrical shape. They can be angular or round channels, pores or bubbles, for example. The cavities can be arranged regularly or irregularly. The core preferably has a corrugated, angled, honeycomb or foam-like profile. The core can, for example, be a corrugated metal or corrugated cardboard. Similar to a corrugated metal or corrugated cardboard, the core can also be angled rather than corrugated, e.g. with a rectangular or triangular shape. In addition, similar to a corrugated metal or corrugated cardboard, the core can also be made from plastic. An angled or corrugated plastic profile can be extruded, for example. A multi-wall sheet, for example, can also be used as a plastic core.

The thickness of the core is preferably in the range from 5 to 50 mm. Due to the large number of cavities, the weight of the core is low in relation to its thickness. The density is preferably from 10 to 1000 kg/m$^3$.

The outer layers on either side of the core of the composite of the present invention may each independently be composed of metal, plastic, glass, natural material and/or carbon. The outer layers are generally films, sheets, fiber mats and/or foams. Fiber mats can, for example, be meshes, woven fabrics, knitted fabrics, braided fabrics, nonwoven fabrics or felts. Preferred metals for the outer layers are aluminum, magnesium and alloys thereof. Preferred plastics are polyamides, polyesters, polycarbonates, polypropylenes, polystyrenes, ABS, PAI and mixtures thereof. Natural materials for the outer layers can be, e.g., flax, sisal, jute and hemp. The outer layers on either side of the core can be the same or different.

The thickness of the outer layers is preferably from 0.1 to 2 mm. The weight per unit area of the outer layers is preferably from 225 to 1200 g/m$^2$.

A casting resin system at least partially penetrates the outer layers and the core of the composite of the present invention. This means that the casting resin system partially or entirely fills the cavities of the core. In the same way, the casting resin system penetrates the fibers and pores, cavities or the like of the outer layers if they consist of fiber mats or foams. If the outer layers are films or sheets, the casting resin system lies between the outer layers and the core and partially or entirely wets the outer layers. The casting resin system serves to bond together the layers, which are press molded under exposure to heat before the casting resin system cures. In the case of fibrous outer layers, the casting resin system also fixes the fibers and forms the surface of the composite component. In particular, it gives the composite component a high strength and rigidity by bonding the layers together. This composite, composed of at least one core, two outer layers and a casting resin system, is known from the prior art (e.g. EP 1 319 503 A) and within the meaning of the present invention is also referred to below as a "sandwich structure".

The casting resin system can be a one-component or multi-component system, e.g., a two-component system. It can be foaming or non-foaming. Examples of possible casting resin systems are: polyurethane (PU) systems, polyester resin systems, epoxy resin systems, and acrylic resin systems. A two-component PU system is preferably used, most preferably a two-component PU system as described in EP 1 319 503 A page 2, line 26 to page 3, line 20. The weight per unit area of the cured two-component PU system is preferably from 400 to 1200 g/m$^2$.

The weight per unit area of the sandwich structure known from the prior art is preferably from 2100 to 3600 g/m$^2$.

In accordance with the present invention, the outer layers are pressed together in at least one area of the sandwich structure of the composite component and the sandwich structure in the compressed area is encapsulated with thermoplastic polymer. Within the meaning of the present invention, pressing together the outer layers of the sandwich structure means that the sandwich structure is pressed together until the outer layers are virtually touching each other. The core between the outer layers is compressed to a minimum in this process.

The pressing together of the outer layers allows thermoplastic polymer to bond with the sandwich structure in the injection molding process. In the sandwich structure known from the prior art where the outer layers are not pressed together, the problem occurs that during injection molding of the thermoplastic polymer onto the sandwich structure the polymer spreads uncontrollably into the core due to the high injection pressure and deforms or damages the sandwich structure as a consequence. Since after the pressing together of the outer layers according to the invention, the outer layers are virtually lying against each other, the plastic melt can no longer flow between the outer layers into the core during injection molding. The pressing together thus prevents the plastic melt from penetrating uncontrollably into the core during injection molding and deforming or damaging the core due to the high injection pressure needed for handling the thermoplastic polymer. The pressing together of the outer layers also prevents an uncontrolled overspraying of the composite component, since the plastic melt can only penetrate into the cavity of the injection mold in the area where the outer layers are pressed together. In the other areas where the outer layers are not pressed together, the composite component lies against the inner wall of the mold cavity, sealing the mold cavity against an uncontrolled spreading of the plastic melt.

The outer layers can be pressed together in an edge area of the sandwich structure of the composite component, for example, and encapsulated with thermoplastic polymer. The sandwich structure can thus be provided with a partial or continuous encapsulated edge of thermoplastic polymer. The outer layers of the composite component can also be pressed together during production in any other area, however, depending on which area of the composite component is to be encapsulated with thermoplastic polymer. For example, if the composite component has openings, the edges of the openings can be compressed and encapsulated with thermoplastic polymer. Beads and other deformations in the surface of the composite component can also be compressed and encapsulated with polymer.

On the other hand, it is also possible to deliberately allow the plastic melt to enter the core in one area of the composite component, creating an undercut and hence a positive bond between the sandwich structure and the thermoplastic polymer. This can be done, for example, by pressing together the outer layers of the composite component at some distance from the edge of the sandwich structure or of an opening, e.g., in an annular shape around the opening. During injection molding the plastic melt enters the core through the open, i.e. uncompressed, edge of the opening. Due to the compression, however, the plastic melt cannot spread uncontrollably into the core but only at most as far as the compressed area, e.g., around the opening.

The thermoplastic polymer with which the sandwich structure is encapsulated by injection molding is preferably a non-reinforced, reinforced and/or filled polymer based on polyamide (PA), polyester, particularly polyethylene terephthalate (PET), polybutylene terephthalate (PBT), polystyrene (PS), acrylonitrile-butadiene-styrene (ABS), thermoplastic polyurethane (TPU), polyolefin, in particular polypropylene (PP), polyethylene (PE), polycarbonate (PC), polypropylene oxide (PPO), polysulfone (PSO), polyphenylene sulfide (PPS), polyimide (PI), polyether ether ketone (PEEK) or a mixture of these polymers.

Encapsulating the sandwich structure composed of core and outer layers with casting resin system with thermoplastic polymer allows the rigidity and strength of the sandwich structure to be increased. Furthermore, functional elements such as reinforcing, stiffening or joining elements, can be injection molded onto the sandwich structure at any point, e.g., on the edge or on the surface, in a variety of ways. In this way, molded parts or components made from other materials, e.g. metal, can be joined to the composite component according to the present invention relatively easily. It is possible in this way to integrate the composite component according to the invention relatively easily into an overall system comprising several identical or different molded parts or components. Several molded parts in the style of the composite component according to the invention can also be joined together in this way.

The invention also provides a process for the production of the composite component according to the invention. In this process, the steps are as follows:

(i) Inserting the core and the outer layers into a compression mold, the core being positioned between the outer layers, (ii) Applying the casting resin system to at least one of the outer layers, steps (i) and (ii) being performed in any order, (iii) Press molding the core with the outer layers to form the sandwich structure and pressing the outer layers together in at least one area of the sandwich structure, (iv) Removing the sandwich structure press molded according to step (iii) from the mold, (v) Inserting the press molded sandwich structure into an injection mold and injection molding thermoplastic polymer onto the sandwich structure in the area where the outer layers have been pressed together.

The sandwich structure of the composite component of the present invention is produced by means of the compression molding process, i.e. the outer layers are bonded to the core by press molding, in particular all-over press molding (herein step (iii)). Before press molding, the casting resin system is applied in the liquid state to at least one outer layer, in particular to its entire surface (step (ii)). The casting resin system can be applied by spraying, for example. Application of the casting resin system (step (ii)) can take place inside the compression mold after insertion of the outer layers and core (step (i)) or outside the compression mold before insertion of the outer layers and core. In the compression mold, the core is positioned between the outer layers (step (i)) and then press molded (step (iii)). The performance of the process is described in EP 1 319 503 A, for example.

Before the casting resin system is cured, the outer layers of the sandwich structure according to the invention are pressed together in a desired area, e.g. in the edge area (step (iii)). Press molding of the core with the outer layers to bond the layers together and pressing together of the outer layers in selected areas takes place in a compression mold simultaneously or successively. The pressing together of the outer layers advantageously takes place in the same compression mold as the press molding of the outer layers and the core to produce the sandwich structure per se.

In principle, however, it is also possible for the two sub-steps to be performed successively in different compression molds. After curing, optional cooling and mold release (step (iv)), the press molded sandwich structure is placed in an injection mold and encapsulated with thermoplastic polymer in the injection mold in the areas where the outer layers have been pressed together (step (v)).

The composite component according to the invention can be used, for example, in automotive construction for elements of door cladding, vehicle floors, instrument panels, instrument panel supports and horizontal body parts, but also for elements of furniture or domestic appliances. The thermoplastic polymer injection molded onto the press molded sandwich structure can be a functional element, e.g., a reinforcing rib.

The invention is explained in more detail by reference to the drawings.

In FIG. 1, the composite component 1 is positioned between the two mold halves 2, 2' of the injection mold (not shown). The composite component 1 is made up of two outer layers 3, 3' and a core 4 having, e.g., a honeycomb structure. The core 4 is positioned between the two outer layers 3, 3'. In the embodiment of the composite component 1 shown in FIG. 1, the outer layers 3, 3' have been pressed together in their edge area 5, 5' so that the outer layers 3, 3' are virtually lying against each other. The core 4 positioned between the outer layers 3, 3' is virtually entirely compressed in the compressed edge area 5, 5'. In the compressed edge area 5, 5', the composite component 1 is encapsulated with thermoplastic polymer 6. The thermoplastic polymer 6 does not penetrate into the core 4 of the composite component 1 between the outer layers 3, 3' that have been pressed together.

Figure 2:
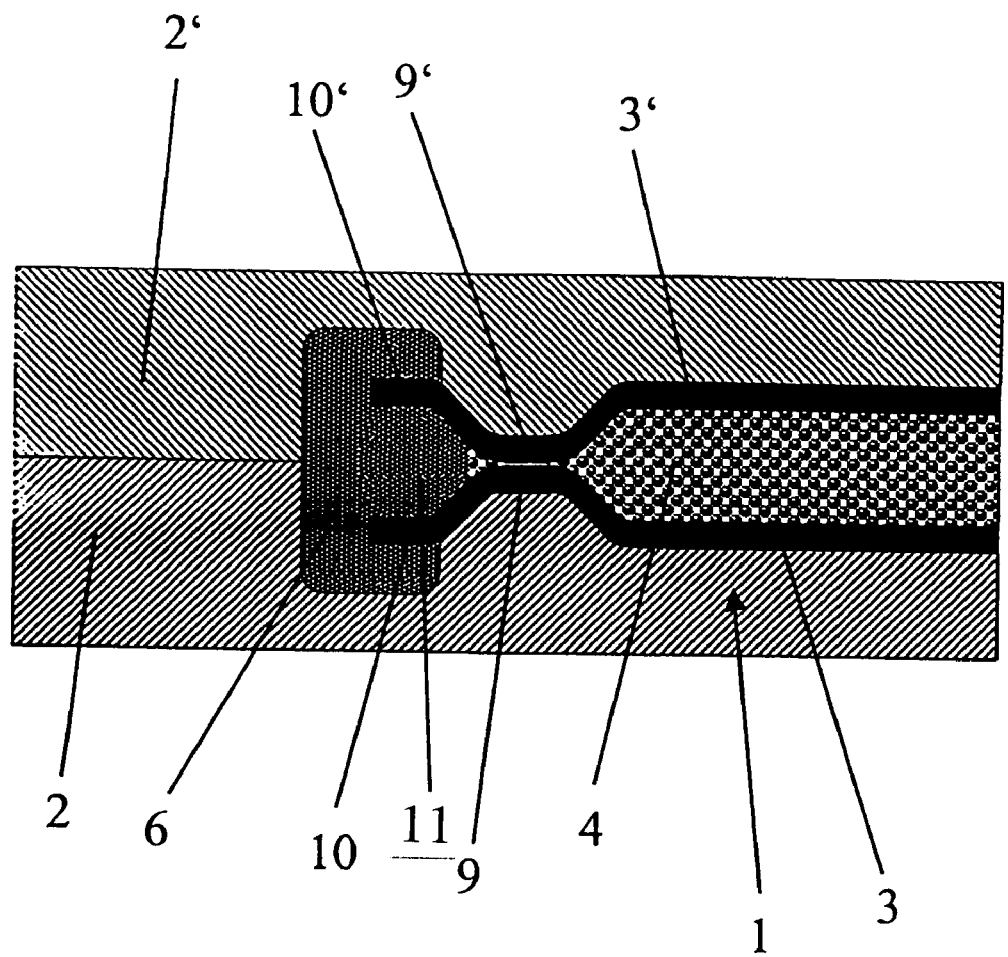
FIG. 2 shows a schematic cross-section of a section of the composite component according to the invention in the injection mold after injection molding of the thermoplastic polymer in a compressed edge area, the polymer penetrating into the core in an uncompressed area

In contrast to the embodiment shown in FIG. 1, in the embodiment illustrated in FIG. 2, the two outer layers 3, 3' are not pressed together directly in the edge area 10, 10', but in an area 9, 9', which is some distance from the edge 10, 10'.

During injection molding of thermoplastic polymer 6 onto the composite component 1, thermoplastic polymer 6 penetrates into the core 4, i.e., between the outer layers 3, 3', in the uncompressed edge area 10, 10'. The thermoplastic polymer 6 penetrates into the core 4 as far as the compressed area 9, 9'. The injection molded polymer 6 thus forms an undercut 11. In the area 9, 9' where the outer layers 3, 3' have been pressed together, the polymer 6 penetrates no further into the core 4. The compressed area 9, 9' prevents a further, in particular uncontrolled, spread of the polymer melt 6 into the core 4.

Figure 3:
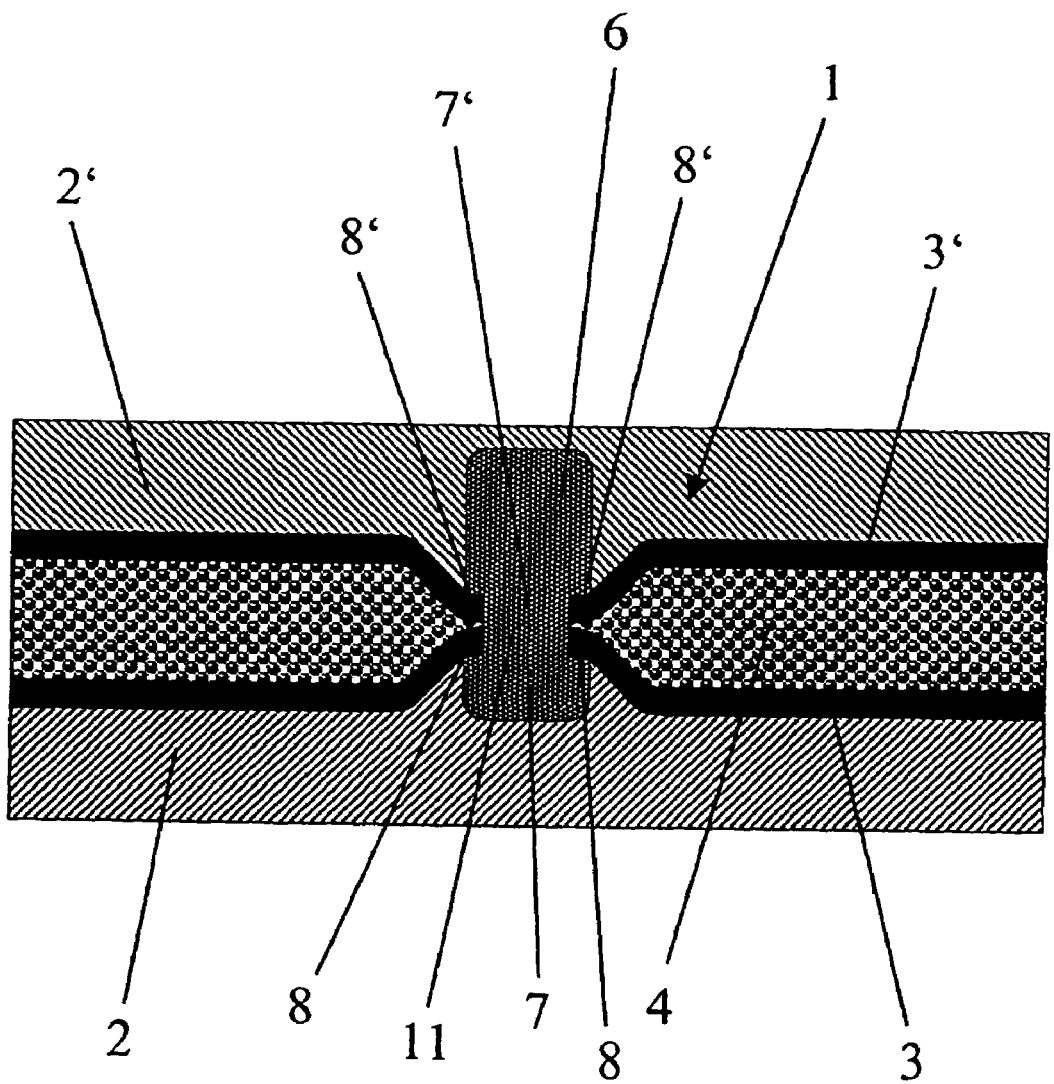
FIG. 3 shows a schematic cross-section of a section of the composite component according to the invention in the injection mold after injection molding of the thermoplastic polymer in the area of a compressed opening in the composite component

FIG. 3 shows a further embodiment of the composite component 1 which is positioned between two mold halves 2, 2' of the injection mold (not shown). The outer layers 3, 3' display overlying openings 7, 7'. The core likewise displays an opening 11 in the area of the overlying openings 7, 7'. The outer layers 3, 3' are pressed together at their perimeter edges 8, 8' of the openings 7, 7'. The overlying openings 7, 7', and 11 are encapsulated with thermoplastic polymer 6 so that the polymer 6 forms a positive bond with the composite component 1.

In another embodiment, which is not shown, it is also possible to make an opening in the encapsulated thermoplastic polymer, for example.

Having thus described the invention, the following Example is given as being illustrative thereof.

EXAMPLE

A sandwich structure was formed from a paper honeycomb of thickness 6 mm having a weight per unit area of approx. 1000 g/m$^2$ as core and two glass fiber mats each having a weight per unit area of approx. 400 g/m$^2$ on either side of the core. The layers were bonded together with a polyurethane casting resin system comprising polyol and diisocyanate (Baypreg F®, Bayer AG, Germany) having a weight per unit area of approx. 400 g/m$^2$ by press molding in a compression mold. The weight per unit area of the sandwich structure produced in this way was 2630 g/m$^2$ (density 0.4 g/cm$^3$).

At the same time as the layers were press molded together in the compression mold, i.e. in a single process step, the outer layers of the sandwich structure were pressed together at their outer edge area before curing of the polyurethane casting resin system. After curing of the PU resin, the molded part was removed from the mold and placed in an injection mold.

In the compressed edge area, polyamide 6 GF 30 was injection molded onto the sandwich structure in the injection mold. The thickness of the injection molded plastic was 6 mm. The overall thickness of the composite component was 6 mm, the density was approx. 0.7 g/cm$^3$ and the weight per unit area was approx. 4400 g/m$^2$. The injection molded thermoplastic polymer did not penetrate into the core between the outer layers.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite component based on a sandwich structure comprising:
   (a) at least two outer layers each of which comprises a film, a sheet, a fiber mat and/or a foam made from metal, plastic, glass, natural material and/or carbon, and
   (b) a core positioned between the outer layers which comprises metal, plastic, natural material and/or paper having a large number of cavities,
      in which, a casting resin system at least partially penetrates the outer layers and the core, the outer layers are bonded to the core by press molding, the outer layers of the sandwich structure are pressed together in at least one area and the resultant compressed area of the sandwich structure is encapsulated with thermoplastic polymer.

2. The composite component of claim 1 in which the core (b) has a corrugated, angled, honeycomb or foam-like structure.

3. The composite component of claim 2 in which the outer layers (a) are fiber mats.

4. The composite component of claim 1 in which the outer layers (a) are fiber mats.

5. The composite component of claim 1 in which the casting resin system is a two-component polyurethane system.

6. The composite component of claim 1 in which the outer layers are pressed together in the edge area of the sandwich structure and the compressed edge area is encapsulated with thermoplastic polymer.

7. The composite component of claim 1 in which the outer layers are pressed together at or around an opening, a bead or deformation in the sandwich structure and the compressed area is encapsulated with thermoplastic polymer.

8. The composite component of claim 1 in which the encapsulated thermoplastic polymer near the area of the outer layers that have been pressed together at least partially fills the cavities in the core in such a way that it forms an undercut.

9. The composite component of claim 1 in which the thermoplastic polymer is a non-reinforced, reinforced and/or filled polymer based on polyamide, polyester, polystyrene, acrylonitrile-butadiene-styrene, thermoplastic polyurethane, polyolefin, polycarbonate, polypropylene oxide, polysulfone, polyphenylene sulfide, polyimide, polyether ether ketone or a mixture of these polymers.

* * * * *